Patented Mar. 19, 1946

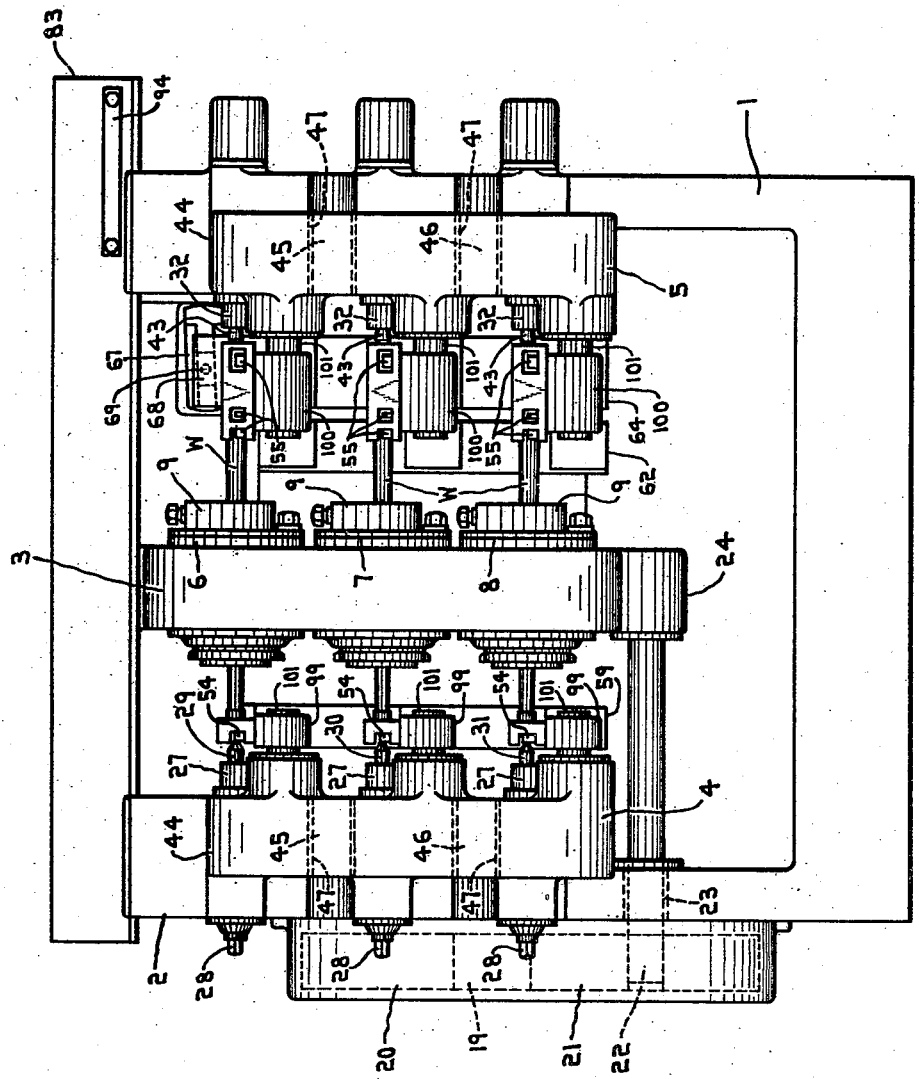

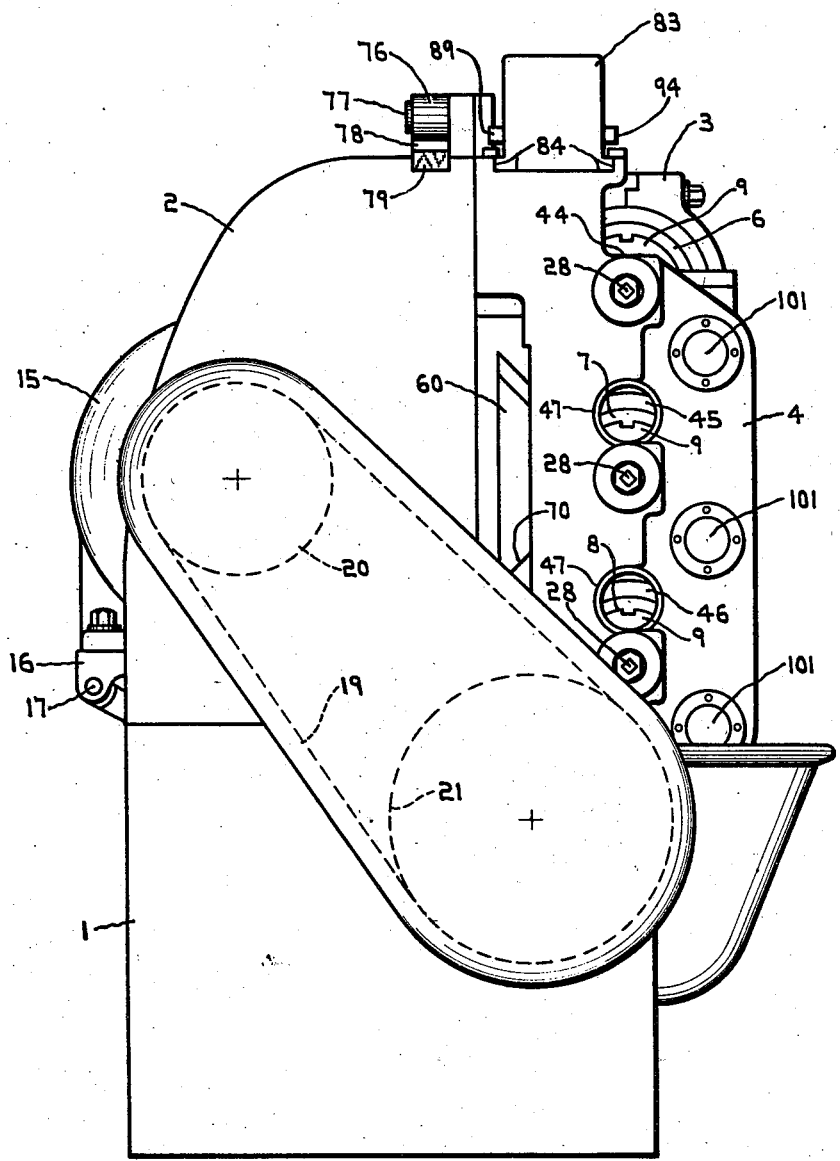
FIG.II

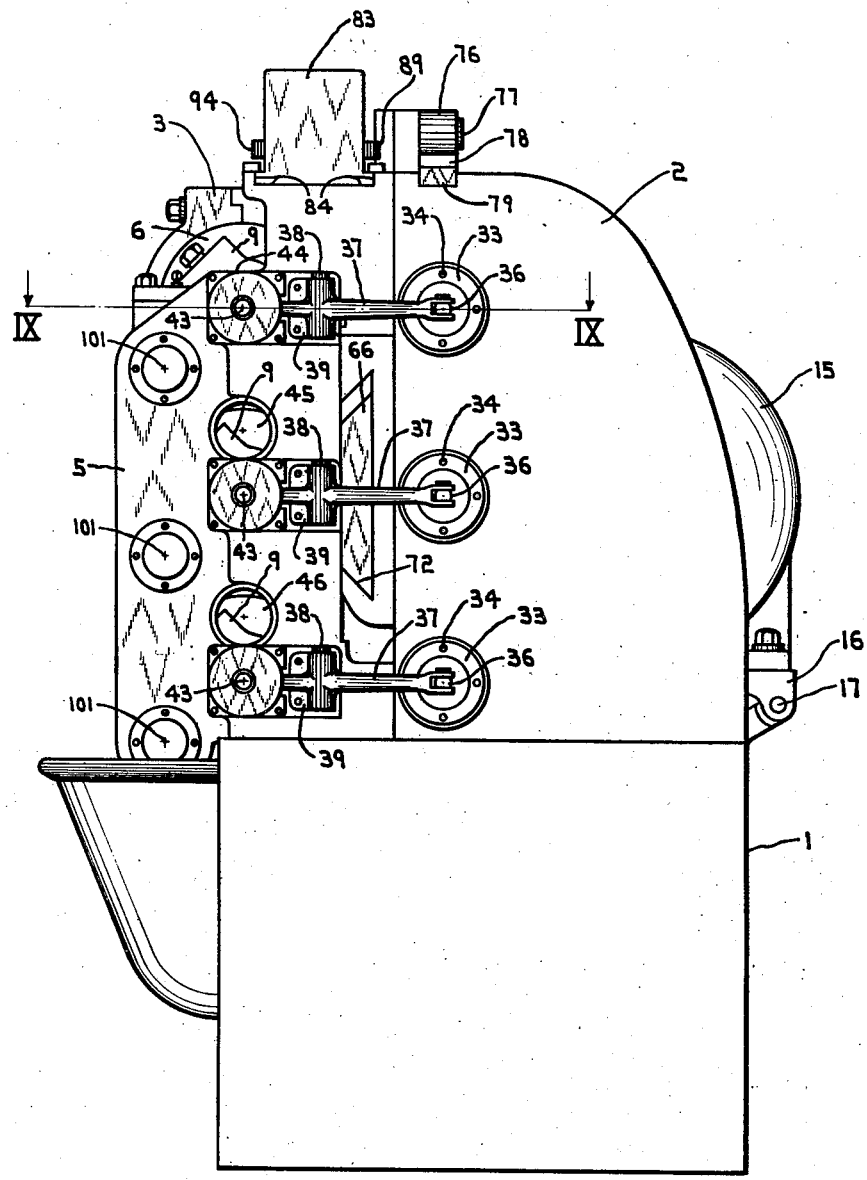
FIG. III

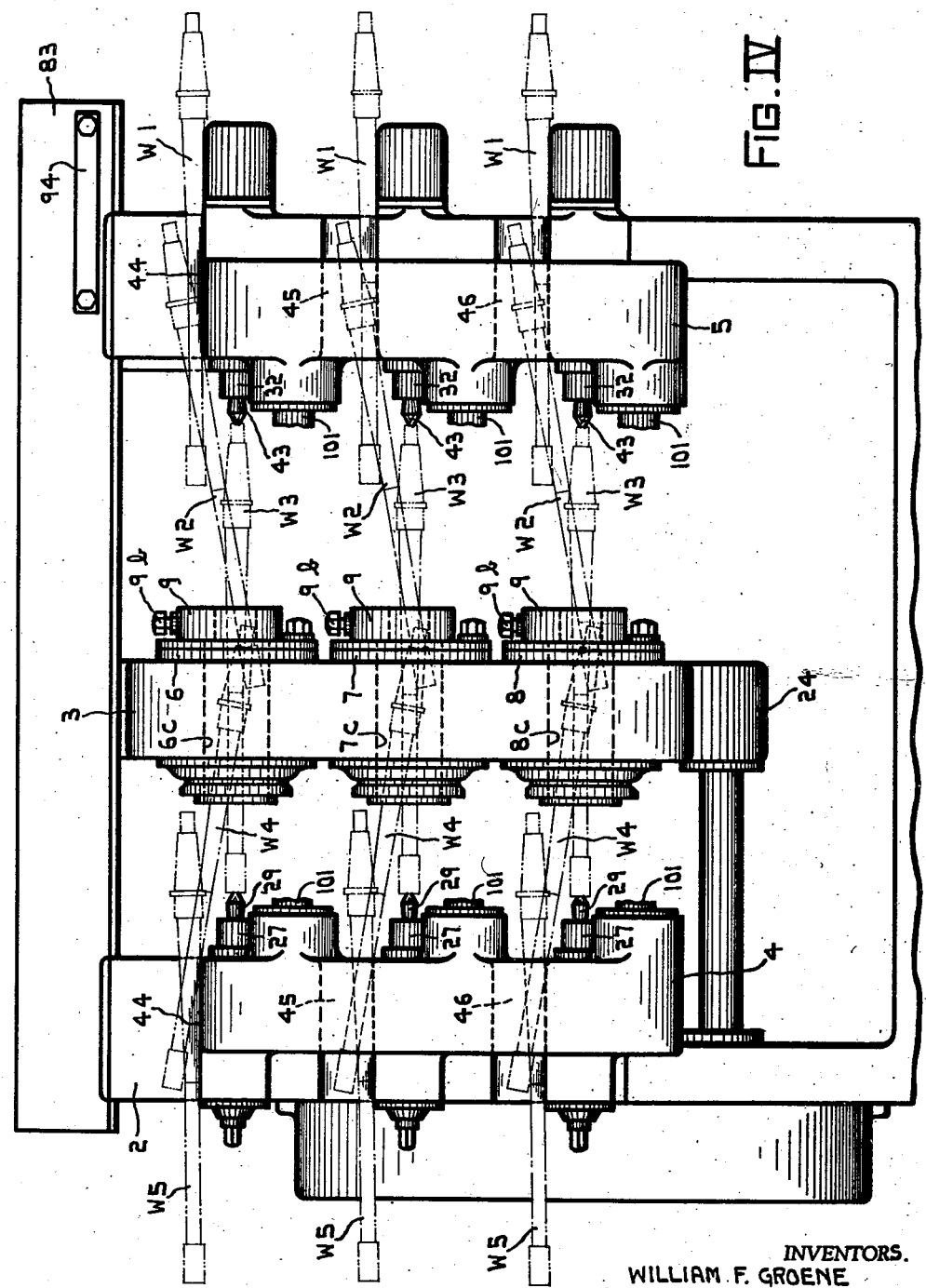

2,396,783

UNITED STATES PATENT OFFICE 2,396,783

MULTIPLE SPINDLE CENTER DRIVE LATHE

William F. Groene and Arthur W. Aufderhar, Cincinnati, Ohio, assignors to The R. K. Le Blond Machine Tool Company, Cincinnati, Ohio, a corporation of Delaware Application June 20, 1942, Serial No. 447,810

4 Claims. (Cl. 82—3)

This invention pertains primarily to multiple spindle lathes of the center drive type in which a plurality of work pieces are chucked and rotated by means of center drive chucking mechanism and are supported rotatively on their ends by means of the usual tailstock centers of such center drive lathes. In lathes of the center drive type it has always been a problem to load the work pieces past the tailstock into the center drive chuck. This problem becomes much more complicated when a plurality of center drive work spindles are to be utilized. This difficulty is brought about by the presence of a plurality of tailstocks which must be associated with the center drive chucks and which must be relatively closely spaced to effect an overall size for the machine well within its range of efficient operation and manipulation by the operator. As a result it has been difficult to effect the loading of each of the work pieces for each of the center drive work spindles past their respective tailstocks and it is one of the chief objects of this invention to obviate this difficulty by providing a single unitary housing for all of the tailstock centers fixed on the frame of the lathe and to provide passageways through this housing eccentric of the work spindle axis through which the work may be axially loaded into the center drive chucks of the work spindles of the lathe.

Further features and advantages of this invention will appear from the detailed descriptions of the drawings in which:

Figure I is a front elevational view of the multiple spindle center drive lathe of this invention, particularly showing the location of the center drive work spindle housing, the end tailstock housing, the loading passageways through the tailstock housing for axial insertion of the work pieces in the center drive chucks on the work spindle, and also showing the swinging facing tools mounted on the tailstock housing.

Figure II is a left hand end elevational view of the machine of Figure I, particularly showing the belted motor drive connection for rotating the work spindles, and the loading passageways formed in the housing carrying the left hand tailstock centers.

Figure III is a right hand end elevational view of the machine of Figure I particularly showing the hydraulic lever operated mechanism for moving the centers for the right hand tailstocks of the machine and also the loading passageways through the housing for these tailstocks.

Figure IV is a fragmentary diagrammatic front elevation of the machine shown in Figure I, with the tool feeding devices removed, to more clearly show the manipulation of the work into and out of working position on the various work spindles of the machine.

The machine comprises a base 1 upon which is mounted the frame 2, to which is fixed the center drive work spindle housing 3, the left hand tailstock housing 4 and the right hand tailstock housing 5.

In the center drive housing 3 are journaled three center drive work spindles 6, 7, and 8 each having appropriate chucking means 9 for gripping and holding work pieces W in this case comprising automobile axle shafts. These work spindles 6, 7, and 8 have appropriate ring gears as in conventional practice for center drive work spindles, and each of these ring gears is interconnected by suitable idler pinions appropriately journaled in the center drive housing 3 so that all of the work spindles 6, 7 and 8 will be rotated simultaneously in the same direction. All of these work spindles are driven by the main drive motor 15, Figure II which is appropriately mounted on a motor plate 16 mounted on a suitable pin 17 on the base 1 of the machine and which is adjustable by suitable screw for effecting proper tension in the driving belts 19 which operates over the motor pulley 20 and the main drive pulley 21 fixed on the main drive shaft 22 journaled appropriately in the left hand end of the base 1 in a suitable bearing 23 and supported at its inner end in the projecting downward portion 24 of the center drive housing 3. This drive shaft 22 has an appropriate driving pinion which drives an idler gear journaled in center drive housing 3 which in turn is connected in driving relationship with the center drive gear on the lowest work spindle. In this way driving action from the motor 15 effects rotation of the various center drive work spindles 6, 7, and 8 at the appropriate cutting speeds necessary to machine the work pieces W.

In the left hand tailstock housing is mounted the usual tailstock barrels 27 each of which are axially reciprocable by a conventional screw and nut mechanism actuated by rotating the squared end portions 28 of the respective actuating mechanism for each of the tailstock barrels 27, and appropriate centers 29, 30, and 31 are provided in each of the tailstock barrels 27 and these centers appropriately engage center holes in the end of the work pieces W.

The right hand tailstock housing similarly has axially reciprocable tailstock barrels 32 which are actuated by hydraulic pressure, through the medium of fluid pressure cylinders 32 fixed to the frame 2 by suitable screws 34 each having the usual actuating piston and piston rod 35 which is connected to the lever 37 carried on a pivot pin 38 fixed to a bracket 39 on the frame 2 anad having an outer end portion operating in a spool adjustably connected to the tailstock barrel 32 so that reciprocation of these pistons in cylinder 33 effects engagement or disengagement of the center 43 carried in the tailstock barrel 32 with the work to facilitate rapid loading and unloading of the work in the machine. The centers 29 in the left hand tailstock are normally held in fixed position after proper adjustment by rotating the means 28, to thereby axially lengthwise position the work pieces properly on the work spindles with respect to the cutting tools and the center drive chucks 9.

When the piston in the cylinder 33 is actuated to withdraw the centers 43 to the right in Figure I and with the cutting tools appropriately retracted from the work as will be described later, the machine is then in condition for loading and unloading work pieces W into the various work spindles.

With regard to the method of loading the work W in the various work spindles it is to be noted that both of the tailstock housings 4 and 5 are one unit each respectively housing their three tailstock barrels in a single member rigidly fixed to the frame 2 of the machine. It is, therefore, a purpose of our invention to provide satisfactory and adequate means to permit easy insertion of the work pieces W into the work spindle, particularly when there are a plurality of them involved as in this case. In so far as the top work spindle 6 is concerned the work W is loaded over the top of the upper tailstock barrel 27 and 43 over the surface 44 of both of these tailstock housings 4 and 5 there being adequate room in the center drive chucks 9 to permit appropriate tipping of the work piece W from the exact alignment and parallelism with the work spindle axis of each of the work spindles. However, in the lower spindles 7 and 8, access to them for axial loading of the work therein is provided by means of the loading and unloading passageways 45 and 46 respectively for the two lower work spindles. Ordinarily in the operation of this machine it is the customary practice first to load the work spindle by insertion of the work either over the surface 44 of the tailstock housing 5 and through the openings 45 and 46 of this housing to present the work to the centers 29, 30, and 31 and then to insert the centers 43 for the other tailstock barrels 32 by manipulation of the hydraulic cylinder 33 as described. After the work is completed the work in the upper spindle is then moved out over the surface 44 of the left hand tailstock housing 4 and the lower work spindles are relieved of their work pieces W by passing them axially out through the passageways 45 and 46. The machine is then ready for reinsertion of new unmachined work pieces over the surface 44 and through the passageways 45 and 46 of the right hand tailstock housing 5 and feeding the cycle as described is resumed.

This method of handling the work into and out of the machine is best illustrated in Figure IV wherein is shown the work at position W—1 on the right hand side of the machine as it is initially placed on the surface 44 and in the holes 45 and 46 of the right hand tailstock housing 5. The work is then moved along to the position W—2 for each of the work spindles with its left hand end inserted into the chucking devices 9 while their clamping jaws 9a have been moved to withdrawn position by the clamping bolt 9b of the chucks 9, to permit placing of the work into the chuck and into the bore 8c of the respective center drive work spindles 6, 7, and 8. The work is then continued to be moved to the position W—3 and properly mounted on the centers 29 and 43 by moving the tailstock barrels 32 to engage the centers 43 with the ends of the work W. The chuck clamping screw 9b is operated to clamp the work W against the fixed work engaging abutment jaws 9a, of the chucks 9, ready to begin the cutting operation.

At the completion of the cutting operation the centers 43 are removed from the work W and the work is moved from position W—3 to position W—4 with the chucks 9, of course, released from the work. From position W—4 the work is then moved to the final position W—5 where it is removed from the machine. In this last position W—5 it is positioned on the surface 44 and in the passageways 45 and 46 of the left hand tailstock housing 4. It is, of course, obvious that the work could be loaded from left to right as well as from right to left as above described depending upon the desires of the operator and the arrangement of the machine in the line-up in the manufacturing plant.

By means of this unique construction it is possible to provide a unitary rigid housing carrying the tailstock barrels for both the right and left hand sides of the machine while at the same time providing adequate passageway for easy loading of the work pieces into the various work spindles, and in particular the two lower spindles in this illustrative design, without requiring any movement to the tailstock housings. It is also to be noted that these passageways are arranged in the form of a sleeve 47 so as to maintain the operating mechanism in the tailstock housings totally enclosed at all times and free of foreign matter or other dirt or chips which may come from the work in loading it through the various passageways 45 and 46.

Thus it will be seen that we have provided a multiple spindle lathe that may be quickly and easily loaded and as easily unloaded, while, at the same time providing a lathe that, for its capacity, has minimum over-all dimensions so that all parts thereof are easily accessible to the operator.

Having thus fully set forth and described this invention what is claimed as new and desired to be secured by United States Letters Patent is:

1. In a multiple spindle lathe of the center drive type, a frame, spaced substantially parallel tailstock housings on said frame, a work spindle housing intermediate said tailstock housings, a plurality of superposed tailstocks in each said tailstock housing, the tailstocks in one housing being mounted for axial adjustment only, a plurality of work spindles in said work spindle housing, each spindle being axially aligned with a tailstock in the respective tailstock housings, there being openings in each tailstock housing adjacent the tailstocks whereby work may be loaded into the lathe therethrough in an axial direction.

2. In a lathe of the center drive type, a frame, spaced tailstock housings and a work spindle housing intermediate said tailstock housings, all said housings being rigidly fixed to said frame, a plurality of superposed work spindles rotatable in said work spindle housing, a plurality of superposed tailstocks in each tailstock housing, one tailstock in each said housing being aligned with a respective work spindle, there being passageways in each tailstock housing between adjacent tailstocks through which work pieces may be passed axially to load each piece in its adjacent spindle and tailstocks, and means connecting all said work spindles for simultaneous rotation.

3. In a multiple spindle lathe of the center drive type, a frame, first and second housings fixed in spaced relation at the end of said frame respectively, a third housing intermediate said first and second housings, a plurality of superposed tailstocks mounted in said first and second housings, superposed intergeared work spindles rotatably mounted in said third housing, each work spindle being axially aligned with a pair of tailstocks in said first and second housings respectively, there being openings in said first and second housings intermediate and closely adjacent the respective tailstocks through which work pieces may be passed whereby the lathe may be loaded in an axial direction from either end.

4. In a lathe as claimed in claim 3 and each tailstock being movable in an axial direction only, and means for so moving said tailstock, including a lever pivoted intermediate its ends on the first housing, one end of the lever being swivelled to said tailstock, and reciprocable power means connected to shift the other end of said lever.

WILLIAM F. GROENE.
ARTHUR W. AUFDERHAR.